(12) United States Patent
Arkus et al.

(10) Patent No.: US 11,059,598 B2
(45) Date of Patent: Jul. 13, 2021

(54) AUXILIARY POWER SYSTEM FOR ROTORCRAFT WITH FOLDING PROPELLER ARMS AND CRUMPLE ZONE LOADING GEAR

(71) Applicant: Surefly, Inc., Loveland, OH (US)

(72) Inventors: Alan J. Arkus, Amelia, OH (US); Stephen S. Burns, Maineville, OH (US); Patrick Conners, Loveland, OH (US); Wei Wei, Mason, OH (US)

(73) Assignee: Moog Inc., East Aurora, NY (US)

( * ) Notice: Subject to any disclaimer, the term of this patent is extended or adjusted under 35 U.S.C. 154(b) by 280 days.

(21) Appl. No.: 15/994,185

(22) Filed: May 31, 2018

(65) Prior Publication Data
US 2018/0346136 A1    Dec. 6, 2018

Related U.S. Application Data

(60) Provisional application No. 62/513,677, filed on Jun. 1, 2017.

(51) Int. Cl.
*B64C 27/10*   (2006.01)
*B64C 1/06*    (2006.01)
(Continued)

(52) U.S. Cl.
CPC .............. *B64D 27/24* (2013.01); *B64C 1/063* (2013.01); *B64C 25/52* (2013.01); *B64C 27/08* (2013.01);
(Continued)

(58) Field of Classification Search
CPC . B64D 27/08; B64D 2221/00; B64D 2027/08
See application file for complete search history.

(56) References Cited

U.S. PATENT DOCUMENTS

| 1,825,792 A | * | 10/1931 | Henry | ..................... B64C 25/60 244/100 R |
| 4,609,165 A | | 9/1986 | Logan et al. | |

(Continued)

FOREIGN PATENT DOCUMENTS

| CN | 205440847 U | 8/2016 |
| DE | 102014000509 A1 | 7/2015 |

(Continued)

OTHER PUBLICATIONS

International Searching Authority; International Search Report and Written Opinion; PCT/US2018/35353; dated Oct. 9, 2018, 13 pgs.

*Primary Examiner* — Philip J Bonzell
*Assistant Examiner* — Tye William Abell
(74) *Attorney, Agent, or Firm* — Harter Secrest & Emery LLP

(57) ABSTRACT

A vertical take-off and loading (VTOL) rotary aircraft or helicopter has eight propellers in a quad propeller arm configuration where each propeller arm has two counter-rotating propellers. Folding propeller arms are designed to allow storage in a single car sized garage. Each propeller may be powered by a three-phase alternating current motor. The main power plant for the aircraft is a gas combustion engine that generates electricity. If the gas engine fails, a battery backup system will safely bring the aircraft down for a controlled landing. The direct current bus is redundant in that even with a gas combustion engine failure the direct current bus battery pack will safely bring down the aircraft. Various embodiments of this invention may also include a landing gear crumple zone designed to soften a hard landing.

18 Claims, 9 Drawing Sheets

(51) Int. Cl.
  *B64D 27/24* (2006.01)
  *B64C 25/52* (2006.01)
  *B64D 27/08* (2006.01)
  *B64C 27/08* (2006.01)
  B64C 25/32 (2006.01)
  B64D 27/02 (2006.01)
  B64D 41/00 (2006.01)

(52) U.S. Cl.
  CPC .............. *B64C 27/10* (2013.01); *B64D 27/08* (2013.01); *B64C 2025/325* (2013.01); *B64D 2027/026* (2013.01); *B64D 2041/002* (2013.01); *B64D 2221/00* (2013.01)

(56) References Cited

U.S. PATENT DOCUMENTS

| | | | |
|---|---|---|---|
| 6,293,491 B1* | 9/2001 | Wobben | B64C 31/00 244/17.23 |
| 8,052,081 B2 | 8/2011 | Olm et al. | |
| 8,292,215 B2 | 10/2012 | Olm et al. | |
| 8,328,128 B2 | 12/2012 | Wiggerich | |
| 8,596,569 B2 | 12/2013 | Cole | |
| 8,757,542 B2 | 6/2014 | Hopdjanian et al. | |
| 9,109,575 B2 | 8/2015 | Weddendorf et al. | |
| 9,180,964 B2 | 11/2015 | Smith et al. | |
| 9,346,542 B2 | 5/2016 | Leng | |
| 9,388,794 B2 | 7/2016 | Weddendorf et al. | |
| 9,522,730 B2 | 12/2016 | Smith et al. | |
| 9,708,074 B2 | 7/2017 | Jaenker | |
| 9,751,625 B2 | 9/2017 | Phan et al. | |
| 9,751,626 B2 | 9/2017 | Phan et al. | |
| 9,764,837 B2 | 9/2017 | Phan et al. | |
| 9,902,495 B2 | 2/2018 | Phan et al. | |
| 9,932,118 B2 | 4/2018 | Bak et al. | |
| 10,035,596 B2 | 7/2018 | Phan et al. | |
| 10,035,604 B2 | 7/2018 | Bak et al. | |
| 10,040,566 B2 | 8/2018 | Waltner | |
| 10,065,726 B1 | 9/2018 | Phan et al. | |
| 10,077,105 B2 | 9/2018 | Smith et al. | |
| 10,099,794 B2 | 10/2018 | Bak et al. | |
| 10,131,426 B2 | 11/2018 | Judas et al. | |
| 10,167,079 B2 | 1/2019 | Weiner et al. | |
| 10,266,262 B2 | 4/2019 | Phan et al. | |
| 10,272,995 B2 | 4/2019 | Leng | |
| 10,308,358 B2 | 6/2019 | Phan et al. | |
| 10,351,238 B2 | 7/2019 | McAdoo | |
| 2009/0145998 A1 | 6/2009 | Salyer | |
| 2010/0044499 A1 | 2/2010 | Zenon et al. | |
| 2010/0312421 A1 | 12/2010 | Eglin | |
| 2011/0154805 A1 | 6/2011 | Heathco et al. | |
| 2012/0025032 A1 | 2/2012 | Hopdjanian et al. | |
| 2012/0138732 A1 | 6/2012 | Olm et al. | |
| 2012/0261523 A1 | 10/2012 | Shaw | |
| 2012/0305699 A1 | 12/2012 | Cole | |
| 2013/0092789 A1 | 4/2013 | Botti et al. | |
| 2013/0264419 A1 | 10/2013 | Rammer et al. | |
| 2014/0319265 A1 | 10/2014 | Cacciaguerra | |
| 2015/0001336 A1 | 1/2015 | Eglin | |
| 2015/0012154 A1 | 1/2015 | Senkel et al. | |
| 2015/0197343 A1 | 7/2015 | Jaenker | |
| 2015/0210152 A1* | 7/2015 | Arkus | B60W 20/00 180/65.245 |
| 2015/0285165 A1 | 10/2015 | Steinwandel et al. | |
| 2016/0009388 A1* | 1/2016 | Brotherton-Ratcliffe | B64C 29/0016 244/17.13 |
| 2016/0114896 A1 | 4/2016 | Heresco | |
| 2016/0207625 A1* | 7/2016 | Judas | B64C 29/0025 |
| 2017/0016399 A1 | 1/2017 | Bedrine et al. | |
| 2017/0066531 A1* | 3/2017 | McAdoo | B64C 27/08 |
| 2017/0096233 A1 | 4/2017 | Mercier-Calvairac et al. | |
| 2017/0217581 A1 | 8/2017 | Hunter et al. | |
| 2017/0217582 A1 | 8/2017 | Bredenbeck et al. | |
| 2017/0274994 A1 | 9/2017 | Eller et al. | |
| 2017/0291677 A1* | 10/2017 | Harris | B64C 39/024 |
| 2017/0291699 A1 | 10/2017 | Hunter et al. | |
| 2017/0297692 A1 | 10/2017 | Eadie et al. | |
| 2017/0305548 A1 | 10/2017 | Ozaki | |
| 2018/0231986 A1 | 8/2018 | White et al. | |
| 2018/0237138 A1 | 8/2018 | Phan et al. | |
| 2018/0281939 A1 | 10/2018 | Tayman | |
| 2018/0283292 A1 | 10/2018 | Steinwandel et al. | |
| 2018/0312248 A1 | 11/2018 | Leng | |
| 2018/0362152 A1 | 12/2018 | Smith et al. | |

FOREIGN PATENT DOCUMENTS

| | | |
|---|---|---|
| EP | 2778048 B1 | 9/2014 |
| EP | 3000730 B1 | 3/2016 |
| EP | 2877397 B1 | 11/2016 |
| EP | 2914490 B1 | 5/2017 |
| EP | 3299295 A1 | 3/2018 |
| EP | 3434587 A1 | 1/2019 |
| WO | 2012162421 A1 | 11/2012 |
| WO | 2014053057 A1 | 4/2014 |
| WO | WO2015138217 B1 | 9/2015 |
| WO | WO2016053774 A1 | 4/2016 |
| WO | WO2016053944 A2 | 4/2016 |
| WO | WO2016054018 A2 | 4/2016 |
| WO | WO2016054209 A1 | 4/2016 |
| WO | WO2017014508 A1 | 7/2016 |
| WO | WO2017087399 A1 | 5/2017 |
| WO | WO2017197316 A1 | 11/2017 |
| WO | WO2017197325 | 11/2017 |
| WO | WO2017197325 A1 | 11/2017 |
| WO | WO2018076047 A1 | 5/2018 |
| WO | WO2018231321 A2 | 12/2018 |

\* cited by examiner

AUXILIARY POWER SYSTEM FOR ROTORCRAFT WITH FOLDING PROPELLER ARMS AND CRUMPLE ZONE LOADING GEAR

This claims the benefit of U.S. Provisional Application Ser. No. 62/513,677, filed Jun. 1, 2017 and hereby incorporated by reference in its entirety.

BACKGROUND OF THE INVENTION

This invention is in the field of rotary wing aircraft and in particular is for improving the safety and performance of a helicopter.

The lift capacity of a helicopter is totally dependent upon the rotary movement of the rotor blades and a helicopter does not, per se, have any glide characteristics which typify many fixed wing aircraft. Thus, in the event of a main propulsion plant failure in a helicopter, rotor speed drops when power is no longer delivered to the rotor system. Lift developed by the rotor system is largely dependent upon rotor speed. At high enough altitudes, failure of the main propulsion plant will allow the pilot to successfully enter an autorotation mode wherein the descent of the helicopter is used to transfer power into the rotor system, thereby rotating the rotor blades, providing lift and thereby lessening the rate of descent. In a properly designed rotor system, a helicopter will be able to survive a hard landing in the autorotation mode, but only if enough energy is coupled into the rotor system during descent. Due to the limitations of prior art helicopter designs, sufficient energy cannot be coupled into the rotor system unless the helicopter is at or above a minimum altitude at the time of power failure.

However, many of the flight applications for helicopters are and must be conducted at low altitudes which are well below the minimum altitude for safe autorotation. These altitude zones, commonly called "dead man zones", represent altitudes below which power failure in a single engine helicopter will generally result in a crash landing.

Many flight operations are typically conducted in the dead man zones. A high proportion of aircraft loss is caused by loss or partial loss of the main propulsion system in the low and middle altitude zones followed by the inability of the helicopter to autorotate to an undamaged landing.

Therefore, what is needed is a means which will allow minimal damage to and survival of the occupants of a rotary aircraft where, for any reason, a loss or substantial disability is suffered by the main propulsion system.

SUMMARY OF THE INVENTION

According to various embodiments, this invention is directed to a vertical take-off and loading (VTOL) rotary aircraft or helicopter with eight propellers in a quad propeller arm configuration where each propeller arm has two counter-rotating propellers.

The propeller arms in various embodiments of this invention may be folded. Folding propeller arms are designed to allow storage in a single car sized garage. The folding propeller arms allow the aircraft to be stored in a garage. The propeller arms are hinged and held in the extended position with a locking pin. Retracting the locking pin allows the passenger or pilot to fold down the propeller arms to stow the aircraft.

Each propeller may be powered by a three-phase alternating current motor. Each motor receives its alternating current power from a direct current to three phase alternating current inverter module. Each inverter module receives its power from a redundant direct current bus.

The main power plant for the aircraft is a gas combustion engine that generates electricity. If the gas engine fails, a battery backup system will safely bring the aircraft down for a controlled landing. The majority of the battery power will be consumed in approximately three minutes of flight time.

The direct current bus is redundant in that even with a gas combustion engine failure the direct current bus battery pack will safely bring down the aircraft. The direct current bus is managed by a battery management system that ensures the battery pack is always charged. Once the battery management system senses that the gas combustion engine has failed, the main system flight controller will place the aircraft into emergency descent mode which will safely bring down the aircraft. One additional advantage of the direct current bus and gas combustion engine of various embodiments of this invention compared to other electrically driven rotorcraft is that once it lands, the rotorcraft is almost immediately ready for flight because the batteries are continuously charging and power is generated when the gas combustion engine is in operation.

Various embodiments of this invention may also include a landing gear crumple zone designed to soften a hard landing. The landing gear may be made of carbon fiber and is uniquely designed to break in stages on a hard landing, which places all the force on the landing gear and not on the passengers. The landing gear is designed to crumple or fracture in three stages before the fuselage hits the ground. The landing gear will break in stages and in turning slowing down the force of the fuselage hitting the ground.

The landing gear in one embodiment has five triangles on each side, including two center triangles which each have the apex of the triangle pointed downwardly. The bottom section of the landing gear that hits the ground first is longer than the top section that has three points attached to the fuselage. This design absorbs the energy of a hard landing.

Assuming a two passenger, or up to 400 lbs. of payload, the center of gravity is approximately at the middle of the fuselage adjacent the center firewall. The aircraft is designed to descend straight down. On a hard-vertical landing, as described above, the first stage will force the two landing gear pieces to separate away from each other. The second stage will force the inner triangles which are closest to center of gravity to separate and break. The final stage of force is placed on the remaining three triangles of the landing gear.

Emergency landings can be characterized based on how high the aircraft is when a failure event occurs. In the event of engine failure, for example, a redundant DC bus or battery pack will supply enough power to bring the aircraft down safely with approximately four minutes of flight time. In the event of full failure (i.e., engine fails and battery pack is not charged) a ballistic parachute will be deployed. It is anticipated that this scenario would be extremely rare since the detailed pre-flight diagnostics test would not allow vertical takeoff if the battery pack is not charged.

Emergency landings between 4,000 feet and 150 feet altitude may utilize the ballistic parachute. However, with emergency landings under 150 feet, there is not enough time to engage the parachute so this would be considering a hard landing. On failure below 150 feet, the aircraft will not be in a free fall because the propellers will still be spinning but slowing down, which in turn will slow down a free fall descent.

In various embodiments, this invention is a rotary aircraft having a fuselage and four rotor arms with each rotor arm having a distal end and a proximal end. The proximal end of each of the rotor arms is mounted to the fuselage. The aircraft has eight rotors. Each of the rotor arms has two of the rotors mounted to the distal end thereof. A first set of the rotors rotate in an opposite direction of a second set of the rotors with a rotor of each set being mounted on each rotor arm. An axis of rotation of each of the rotors of the first set of rotors is coincident with an axis of rotation of one of the rotors of the second set rotors. The aircraft also may have eight electric motors each coupled to one of the rotors. Batteries are electrically coupled to the electric motors and an inverter is coupled to the batteries. A converter is coupled to the inverter and a generator is coupled to the converter. An internal combustion engine is coupled to the generator to generate electrical energy to charge the batteries and thereby power the motors to rotate the rotors.

These and other aspects of this invention address various shortcomings in the prior art.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
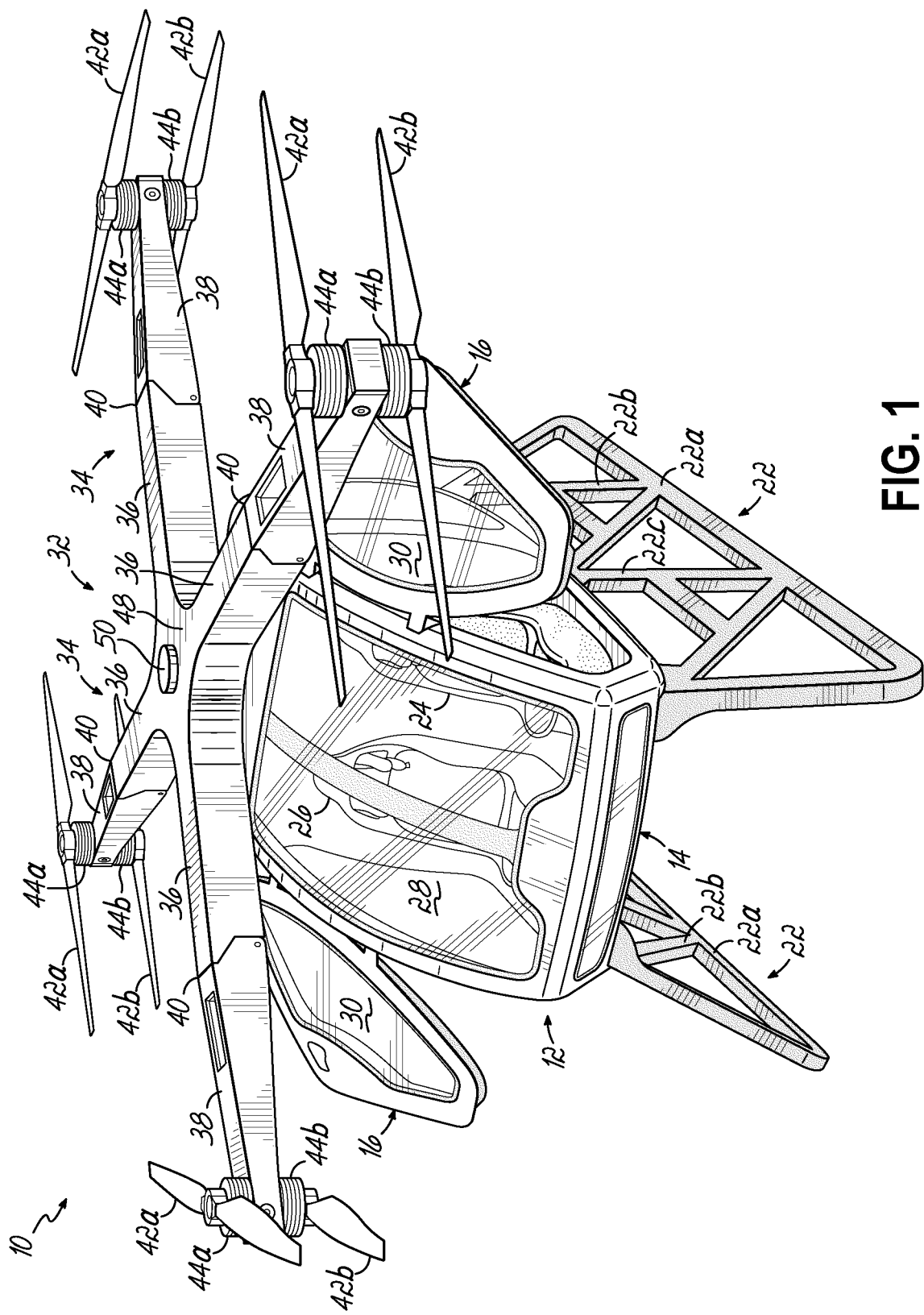
FIG. 1 is a perspective view of one embodiment of a rotorcraft according to this invention with a pair of doors on a cockpit open.
Figure 2:
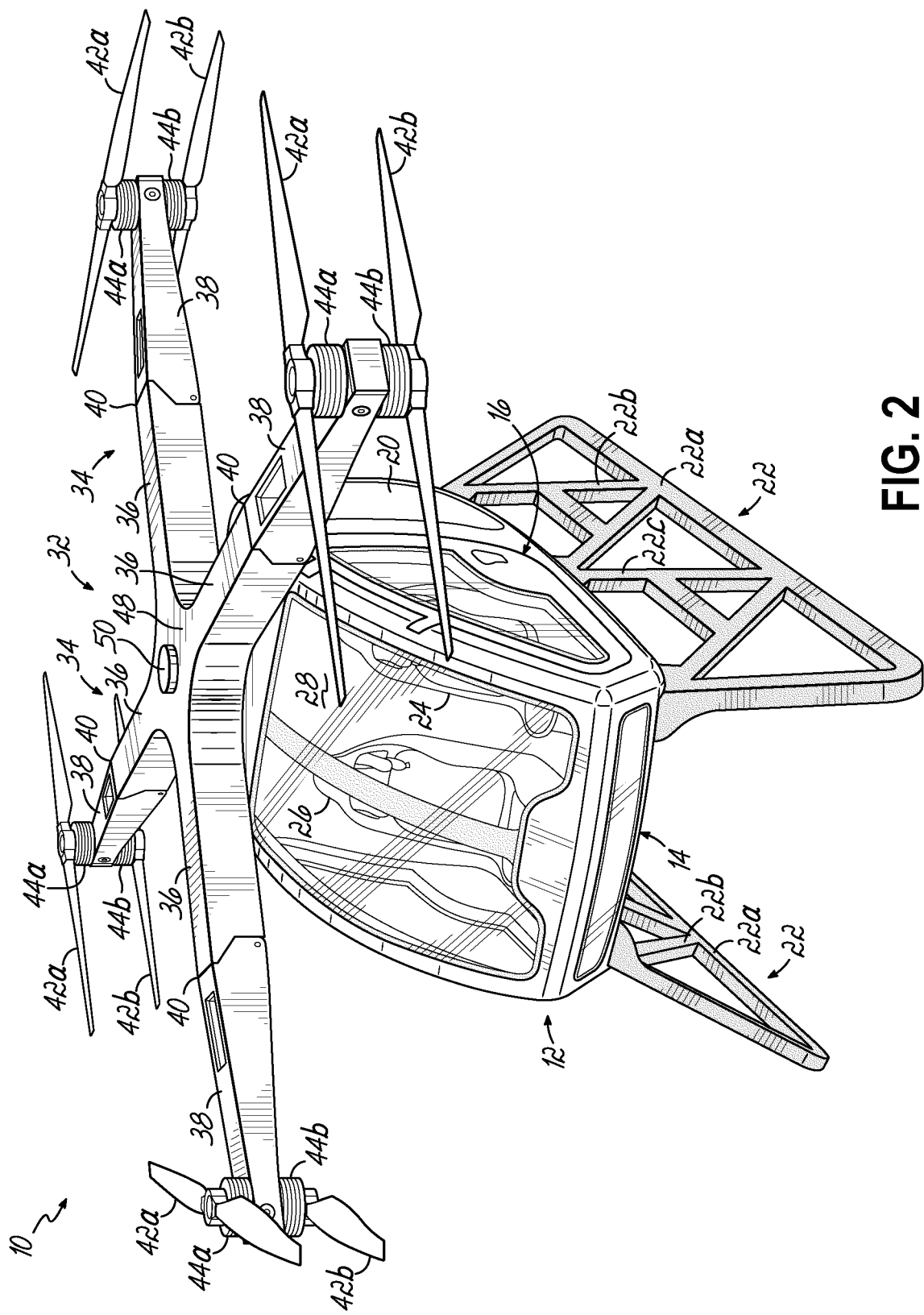
FIG. 2 is a view similar to FIG. 1 with the cockpit doors closed.

Referring to FIGS. 1 and 2, one embodiment of a rotorcraft 10 according to this invention is shown. The rotorcraft 10 includes a fuselage 12. The fuselage 12 includes a cockpit 14 which is accessible via a pair of cockpit doors 16 hingedly connected to either side of the fuselage 12. The fuselage 12 also includes a mechanical compartment 18 likewise accessible via a pair of hinged doors 20 (FIG. 2), one of which is on either side of the fuselage 12.

The rotorcraft 10 may also include a landing gear 22 supporting the fuselage 12 off the ground. In various embodiments, the landing gear 12 includes two skids positioned along either lateral side edge of the fuselage 12. The cockpit 14 may include a pilot seat 24 and a co-pilot or passenger seat 26 facing fowardly through a forward viewing window 28 on the fuselage 12. Windows 30 may also be included on the cockpit doors 16 for lateral viewing from the cockpit 14.

A rotor arm assembly 32 is mounted on top of the fuselage 12 and includes four rotor arms 34, each extending approximately 90° with respect to one another. The rotor arms 34 are mounted to the fuselage 12 in a fixed orientation. Each rotor arm 34 includes a fixed proximal portion 36 and a collapsible distal portion 38. The fixed and collapsible portions 36, 38 of each rotor arm 34 may be joined together by a hinge assembly 40.

A pair of counter-rotating rotors 42 are mounted at the distal end of each rotor arm 34 and oriented generally vertically relative to one another. Each rotor 42 is coupled to an electric motor 44 likewise mounted at the distal end of the rotor arm 34. As such, in various embodiments of the rotorcraft 10 according to this invention, eight rotors 42 are driven by eight distinct electric motors 44 each mounted at the distal end of one of four rotor arms 34 as shown generally in FIGS. 1 and 2. A central hub 48 of the rotor arm assembly 32 may include a cylindrical pod 50 adapted to contain an emergency parachute (not shown).

Figure 3:
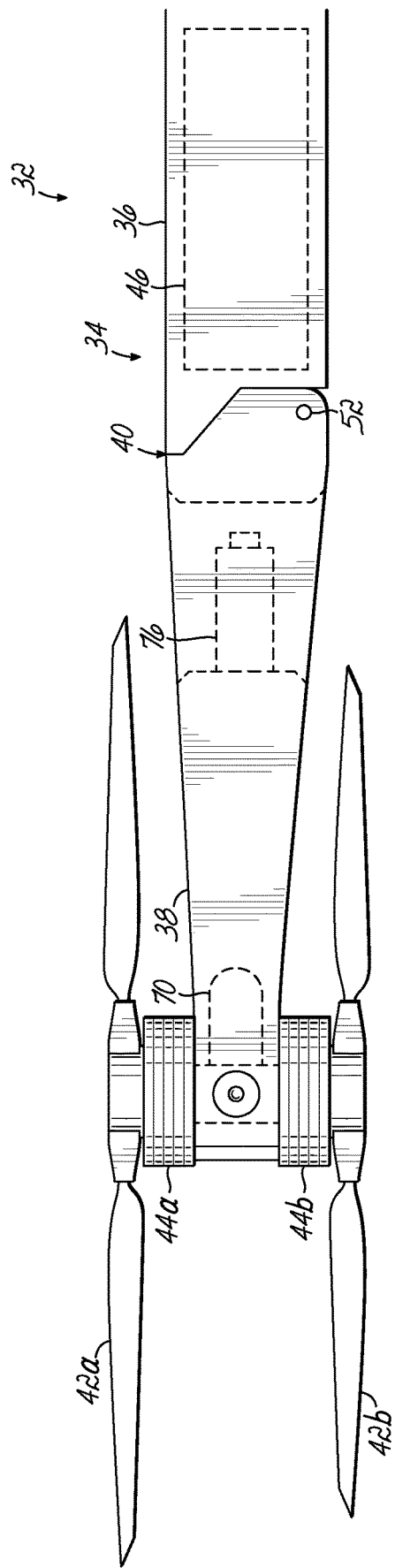
FIG. 3 is an elevational view of a rotor arm of the rotorcraft of FIGS. 1-2 housing a battery pack according to one embodiment of this invention.
Figure 4:
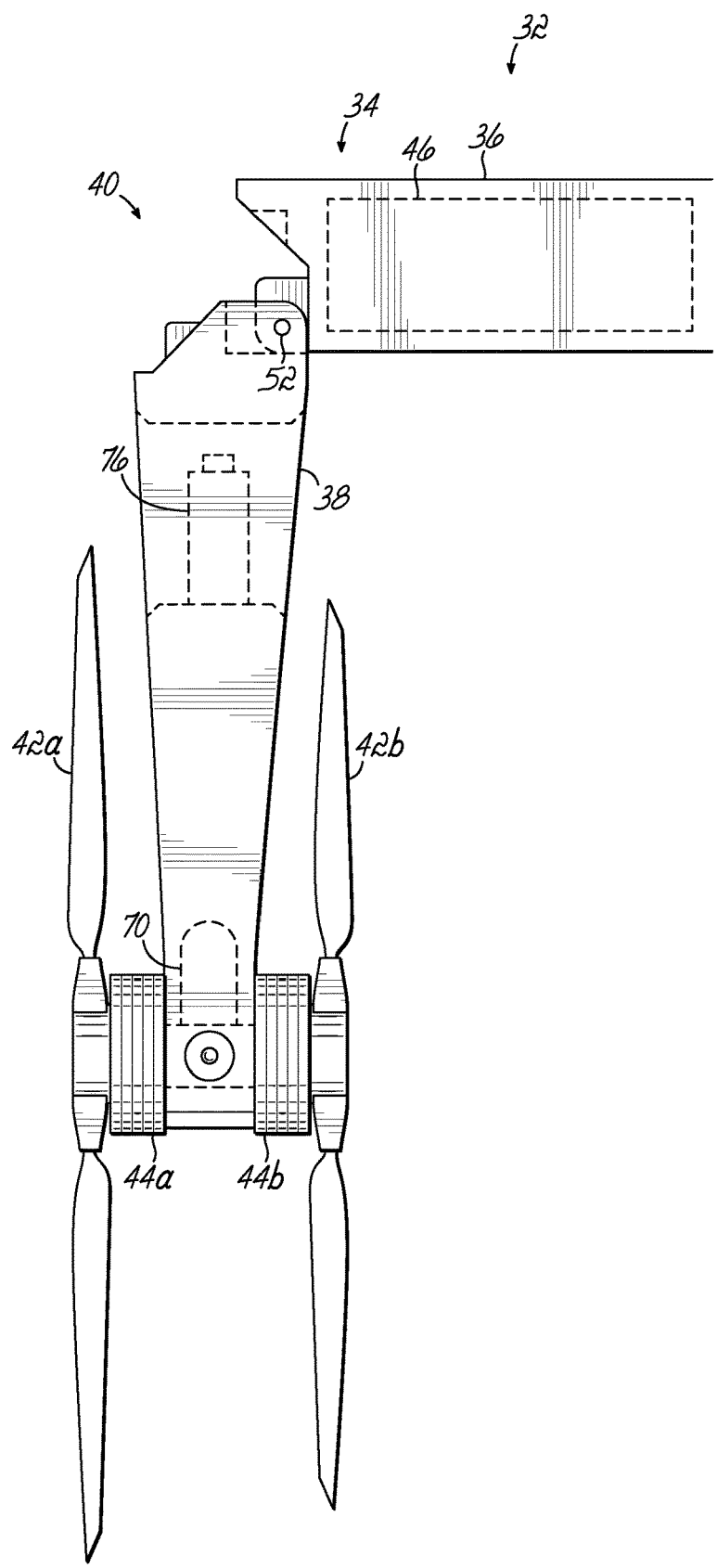
FIG. 4 is a view similar to FIG. 3 with the rotor arm in a collapsed configuration according to one aspect of this invention.

FIGS. 3-4 each show a representative rotor arm 34 according to various embodiments of this invention. The rotor arm 34 includes the hinge assembly 40 joining the two portions 36, 38 of the rotor arm 34 together. Referring to FIG. 3, the fixed proximal portion 36 of each rotor arm 34 may include a battery pack 46 therein. As shown in FIGS. 3 and 4, the distal end of each rotor arm 34 includes upper and lower electric motors 44a, 44b each having a rotor blade 42a, 42b mounted thereto. The lower rotor blade 42b according to various embodiments of this invention is approximately one foot longer than the corresponding upper rotor blade 42a.

Figure 5A:
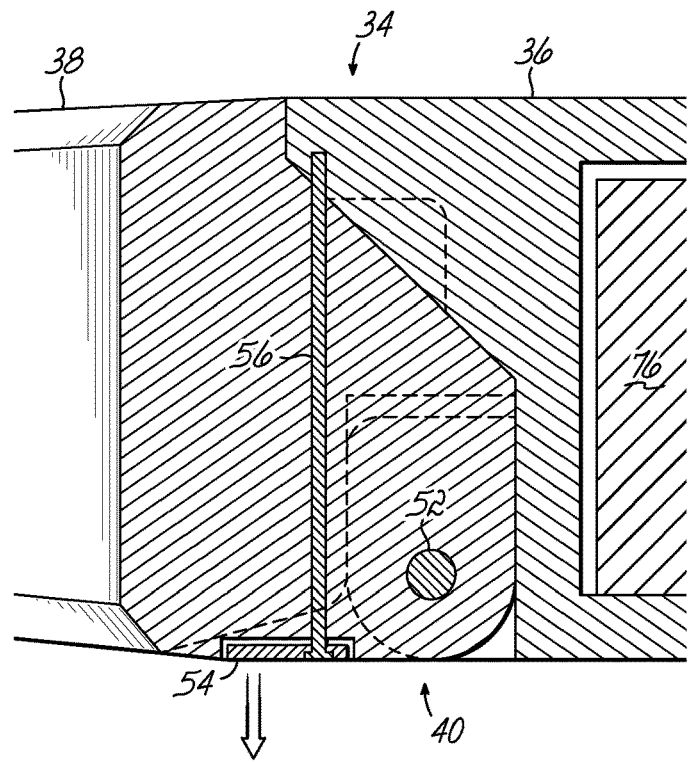
FIGS. 5A thru 7B are cross-sectional views of a hinge assembly one the rotor arm going from an extended position to the collapsed position according to one embodiment of this invention.
Figure 5B:
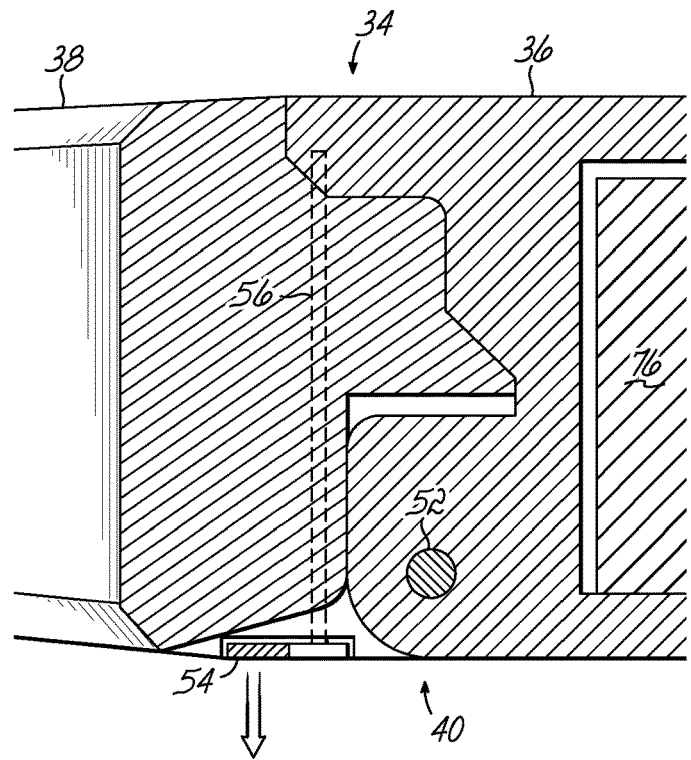
Figure 6A:
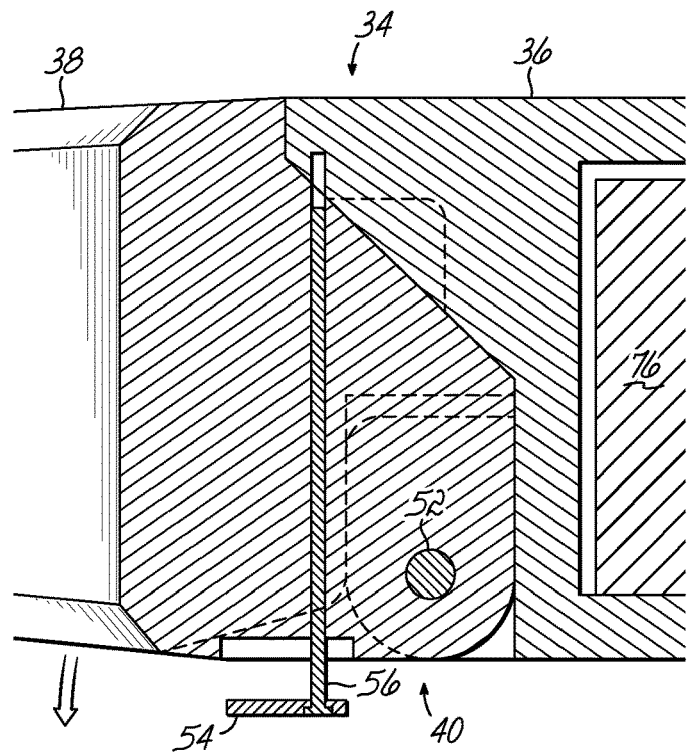
Figure 6B:
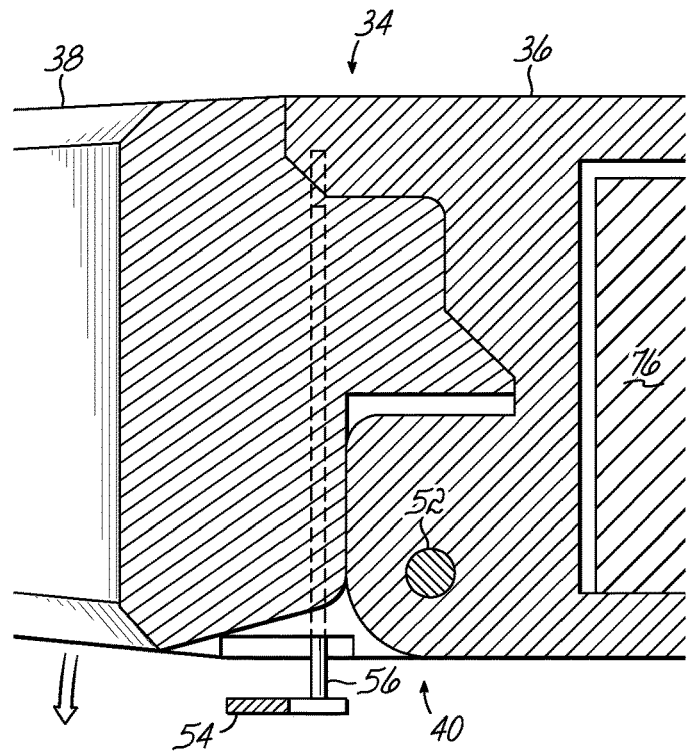
Figure 7A:
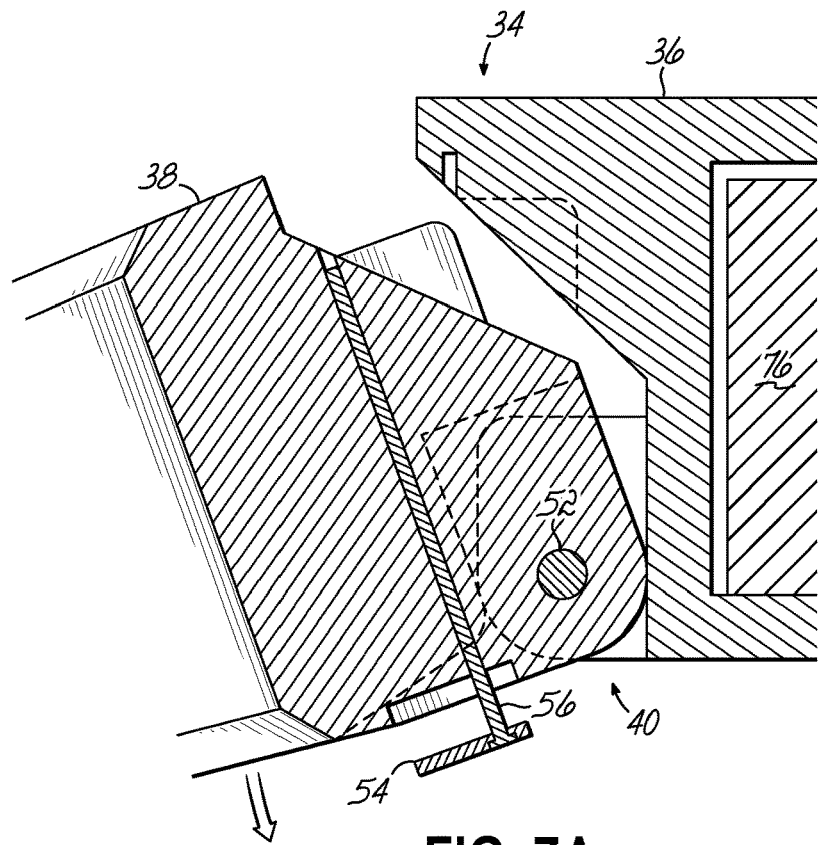
Figure 7B:
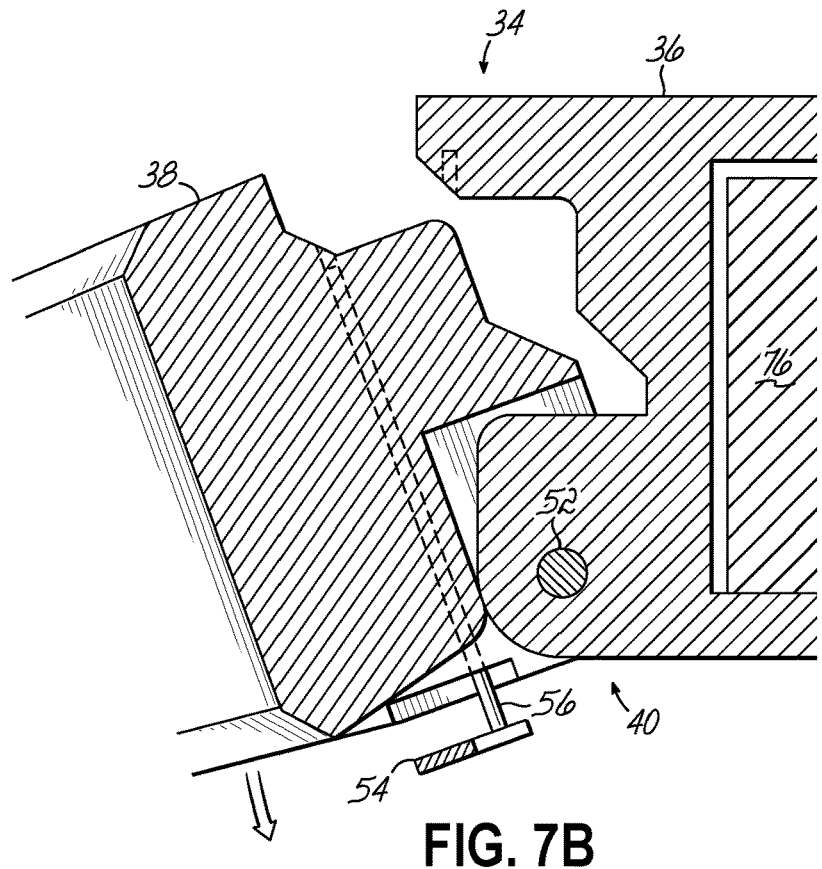

The hinge assembly 40 includes a locking pin 52 which maintains the collapsible portion 38 of the rotor arm 34 in a locked operational or extended position. A hinge assembly handle 54, as shown particularly in FIGS. 5A-7B, is positioned on the lower side of the hinge assembly 40. A pair of rods 56 extend vertically upward from each end of the handle assembly 54 as shown in FIG. 5A to lock the hinge assembly 40. The pivot axis of the hinge assembly 40 allows the collapsible portion 38 of the rotor arm 34 to pivot downwardly relative to the fixed portion 36 of the rotor arm 34. When the handle 54 is pulled downwardly, the rods 56 disengage the hinge assembly and allow the collapsible portion 38 of the rotor arm 34 to rotate downwardly so as to be in a collapsed position at approximately 90° relative to the fixed portion 36 of the rotor arm 34. This arrangement is shown in FIG. 4 with one of the rotor arms 34 in the collapsed position. When all four of the rotor arms 34 are in the collapsed position, the rotorcraft 10 is significantly more compact for storage in a single car garage or other available storage locations. Each rotor arm 34 is constructed of carbon fiber materials to provide appropriate strength and minimize weight parameters.

Figure 8:
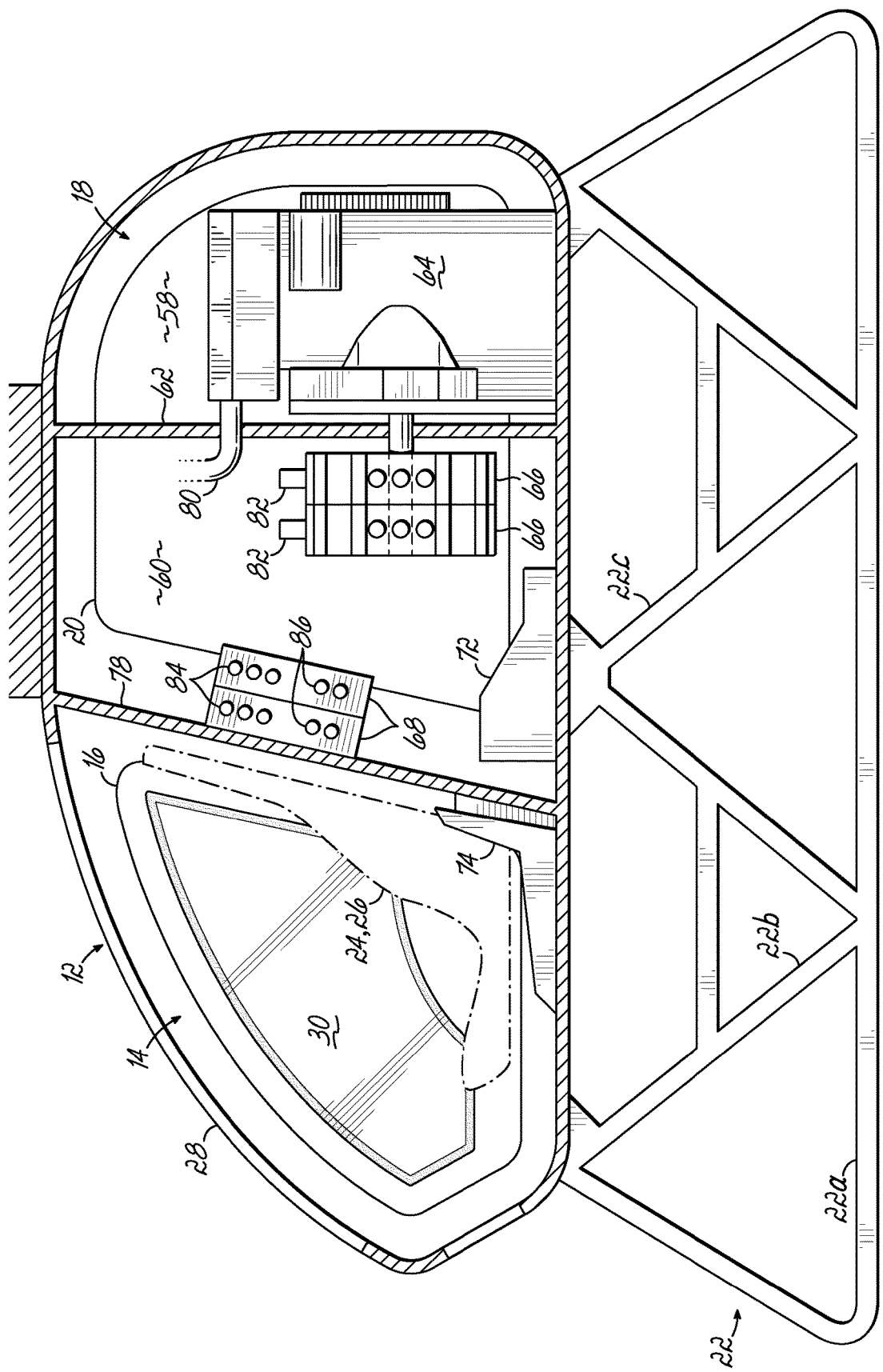
FIG. 8 is a cross-sectional schematic view of a portion of the fuselage according to one embodiment of this invention showing the internal combustion engine compartment and the generator compartment.
Figure 9:
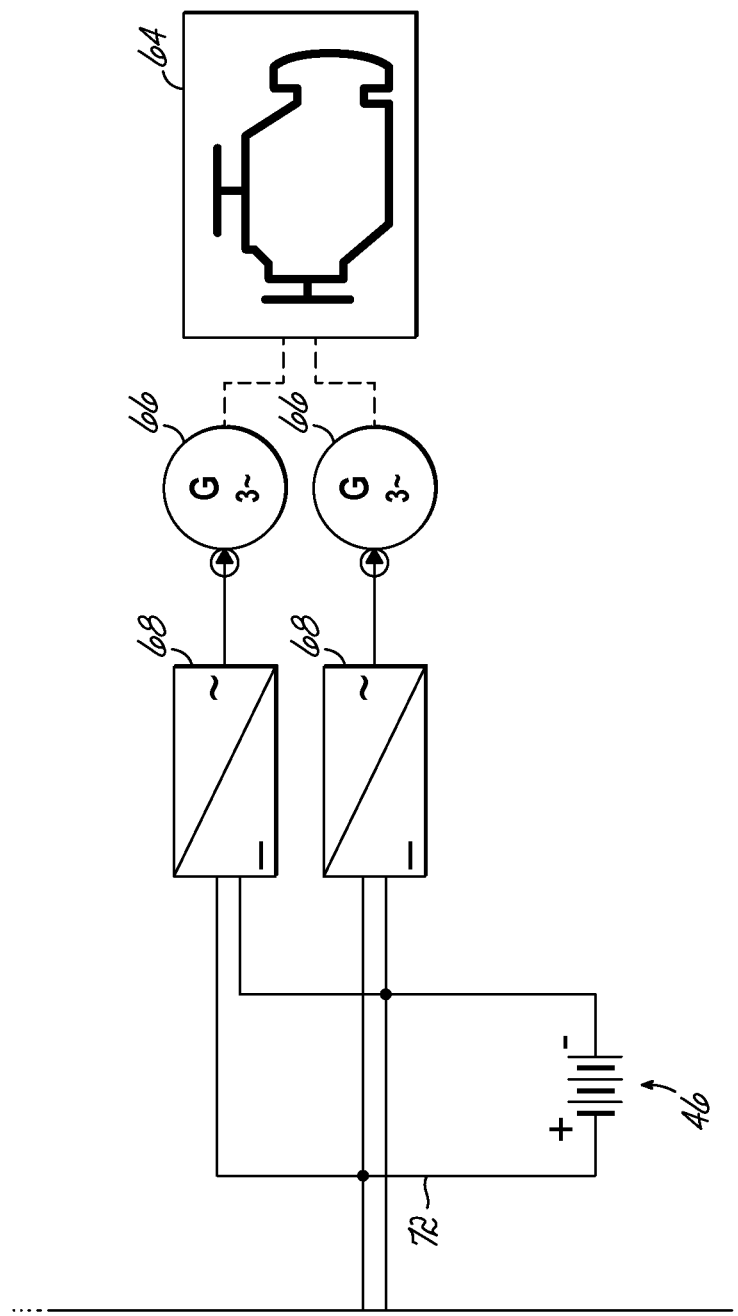
FIG. 9 is a schematic view of the power generating system according to one aspect of this invention.

Referring to FIG. 8, the fuselage 12 includes the mechanical compartment 18 separated into two portions 58, 6o and divided by a bulkhead 62 positioned between those portions. A firewall 78 separates the cockpit 14 from the mechanical compartment 18. The rearward portion 58 houses the combustion engine 64 which in one embodiment is a Honda Civic® gas combustion engine. The engine 64 may include a turbo charger to increase its output. An air intake 8o for the engine 64 is located adjacent to the bulkhead 62. The output shaft of the engine 64 extends through the bulkhead 62 and is coupled to a pair of 75 kW generators 66 which, in various embodiments, may be Yasa P400 generators, www.yasamotors.com/products/p400_series/. The generators 66 may be liquid cooled and the input ports 82 for the liquid are mounted atop the generators as shown in FIG. 8. Output from the dual generators 66 is in the form of alternating current 75 kW electricity which is coupled to a pair of AC to DC converters 68 which, in one embodiment, are Gen4-S10 high-voltage controllers available from Sevcon, www.sevcon.com/products/high-voltage-controllers-gen4-s10/. Each converter 68 includes three input terminals 84 for the three-phase input and two output terminals 86 for the DC output.

Output from the converters 68, in the form of DC electricity, is directed to the rotor arms 34 and coupled to a DC to 3-phase AC speed inverter 70 (FIGS. 3-4 which, in one embodiment, may be Reinhardt Motion Systems 3-Phase AC Speed Inverter PM 100 DZ which is available from Reinhardt Motion Systems, LLC, www.rinehartmotion.com/standard.html. The inverters 70 offer 150 ARMS continuous, 200 ARMS peak at 300-800 VDC. Each inverter 70 is housed within the rotor arm 34 and may be in the collapsible portion 38 and the output, in the form of AC electricity, is coupled to each of the motors 44 on the associated rotor arm 34. A cooler 76 may also be included in the collapsible portion 38 of the rotor arm as shown in FIG. 3. Each motor 44 in various embodiments may be an Emrax 3-Phase AC Motor Model 228 HV which utilizes an axial flux synchronous permanent magnet motor/generator in a sinusoidal 3-phase arrangement. The motors 44 are available from Emrax d.o.o., Slovenia, http://emrax.com/products/emrax-228/.

The power system also includes the battery pack 46 housed within each rotor arm 34 which, in one embodiment, is comprised of Sony DC battery cells VTC5, available from Liion Wholesale, https://liionwholesale.com/products/sony-18650-vtc5-battery-genuine-tested-20-30a-2600mah-flat-top-wholesale-discount?utm_medium=cpc&utm_source=googlepla&gclid=CKqO1MOH-tMCFZqNswodRvkHlg&variant=3247460164. The battery packs 46 are controlled by a battery management system 72, which may be www.stw-technic.com/products/electrification-products/mbms-battery-management/. Each rotor 42 is coupled to the associated motor 44 and is available from Powerfin Propellers out of Hurricane, Utah and is preferably a model F, B, C or E propeller blade mounted on a Powerfins Apex Series dual hub, www.powerfin.com/product-line.

The rotorcopter 10 according to various embodiments of this invention also includes an STW main system flight controller available from STW Technic, LP out of Peach Tree Corners, Ga., www.stw-technic.com/products/canbus-modules/freely-programmable-esx-3xl/. The controller may provide up to 136 software configurable inputs and outputs and can be customizable and configured for the rotorcraft application.

As shown in FIGS. 1 and 2, the rotorcraft according to various embodiments of this invention includes the pair of landing gears 22 supporting the fuselage 12. The fuselage 12, rotor arms 34 and landing gears 22 may each be constructed of carbon fiber.

The landing gears 22 are designed to crumple at specific impact forces during an emergency landing scenario. The lowermost portion 22a of each landing gear 22 is designed to crumple initially and a middle second crumple zone 22b on the landing gear 22 will provide additional cushioning for an emergency landing in that the higher impact forces required to crumple the middle crumple zone. The upper portion 22C of the landing gear 22 is a still further crumple zone for higher force emergency landing scenarios.

Each seat 24, 26 in the cockpit 14 may be mounted with a crumple mount 74 providing still further cushioning in an emergency landing situation for the pilot and passenger.

Additional components of the rotorcraft according to various embodiments of this invention may include GPS, telemetry, and/or sense and avoid technology among other features.

From the above disclosure of the general principles of this invention and the preceding detailed description of at least one embodiment, those skilled in the art will readily comprehend the various modifications to which this invention is susceptible. Therefore, we desire to be limited only by the scope of the following claims and equivalents thereof.

We claim:

1. A non-fixed wing rotary aircraft comprising:
   a fuselage;
   a cockpit sized and adapted to accommodate a human pilot of the non-fixed wing rotary aircraft and having a pilot seat for the human pilot and a cockpit door for access to the cockpit by the human pilot;
   at least one rotor coupled to the fuselage which lifts the fuselage from the ground upon rotation of the rotor and provides thrust to the aircraft;
   an electric motor coupled to the rotor to rotate the rotor about a rotor axis of rotation;
   an internal combustion engine;
   a generator operably coupled to the internal combustion engine and the electric motor;
   the at least one rotor arm having a fixed proximal portion and a collapsible distal portion joined to the fixed proximal portion by a hinge assembly;
   the hinge assembly configured to allow the collapsible distal portion to pivot about a hinge pivot axis relative to the fixed primal portion and the hinge pivot axis being nonparallel to the rotor axis of rotation;
   wherein the at least one rotor arm is collapsible from an operational extended position to a collapsed storage position external of the fuselage.

2. The rotary aircraft of claim 1 further comprising:
   a landing gear adapted to crumple in an emergency landing situation to thereby provide protection to the fuselage.

3. The rotary aircraft of claim 2 wherein the landing gear further comprises:
   a plurality of crumple zones each deforming in response to a different load on the landing gear during the emergency landing situation.

4. The rotary aircraft of claim 1 further comprising:
   a battery electrically coupled to the motor and the internal combustion engine, the battery configured to power the at least one rotor during normal flight operation of the aircraft.

5. The rotary aircraft of claim 4 further comprising:
   a converter coupled to the generator and the motor.

6. The rotary aircraft of claim 5 further comprising:
   an inverter coupled to the converter and to the motor.

7. The rotary aircraft of claim 1 further comprising:
   a plurality of rotors;
   a plurality of motors each rotationally driving one of the plurality of rotors.

8. The rotary aircraft of claim 7 wherein a first set of the plurality of rotors rotate in an opposite direction of a second set of the plurality of rotors.

9. The rotary aircraft of claim 8 wherein an axis of rotation of each of the rotors of the first set of the plurality of rotors is coincident with an axis of rotation of one of the rotors of the second set of the plurality of rotors.

10. The rotary aircraft of claim 7 further comprising:
a plurality of rotor arms, each rotor arm having a distal end and a proximal end, the proximal end being mounted to the fuselage and at least one of the motors and at least one of the rotors being mounted proximate the distal end of each rotor arm.

11. The rotary aircraft of claim 10 wherein two of the plurality of rotors and two of the plurality of motors are mounted proximate the distal end of each rotor arm.

12. The rotary aircraft of claim 10 further comprising at least four rotor arms.

13. The rotary aircraft of claim 12 wherein a first set of the plurality of rotors rotate in an opposite direction of a second set of the plurality of rotors and an axis of rotation of each of the rotors of the first set of the plurality of rotors is coincident with an axis of rotation of one of the rotors of the second set of the plurality of rotors; and
each of the at least four rotor arms having one of the rotors of the first set and one of the rotors of the second set mounted proximate the distal end thereof.

14. The rotary aircraft of claim 10 wherein each of the rotor arms is spaced no more than ninety degrees from an adjacent rotor arm.

15. The rotary aircraft of claim 10 wherein each of the rotor arms of the plurality of rotor arms are collapsible from an operational extended position to a collapsed storage position external of the fuselage.

16. The rotary aircraft of claim 15 further comprising:
a landing gear adapted to crumple in an emergency landing situation to thereby provide protection to the fuselage.

17. A non-fixed wing rotary aircraft comprising:
a fuselage;
a cockpit sized and adapted to accommodate a human pilot of the non-fixed wing rotary aircraft and having a pilot seat for the human pilot and a cockpit door for access to the cockpit by the human pilot;
a plurality of at least four rotor arms, each rotor arm having a distal end and a proximal end, the proximal end of each of the plurality of rotor arms being mounted to the fuselage;
a plurality of at least eight rotors, each of the plurality of rotor arms having two of the plurality of rotors mounted to the distal end thereof, each rotor contributing to both lift and thrust to the aircraft;
wherein a first set of the plurality of rotors rotate in an opposite direction of a second set of the plurality of rotors;
wherein an axis of rotation of each of the rotors of the first set of the plurality of rotors is coincident with an axis of rotation of one of the rotors of the second set of the plurality of rotors;
a plurality of at least eight electric motors each coupled to one of the plurality of rotors;
a plurality of batteries each electrically coupled to one of the plurality of electric motors, the plurality of batteries configured to power the plurality of at least eight electric motors during normal flight operation of the aircraft;
an inverter coupled to the plurality of batteries;
a converter coupled to the inverter;
a generator coupled to the converter;
an internal combustion engine coupled to the generator to generate electrical energy to charge the plurality of batteries and thereby power the plurality of motors to rotate the plurality of rotors.

18. The rotary aircraft of claim 17 further comprising:
at least one of the rotor arms having a fixed proximal portion and a collapsible distal portion joined to the fixed proximal portion by a hinge assembly;
the hinge assembly configured to allow the collapsible distal portion to pivot about a hinge pivot axis relative to the fixed primal portion and the hinge pivot axis being nonparallel to the rotor axis of rotation;
wherein the at least one rotor arm is collapsible from an operational extended position to a collapsed storage position external of the fuselage.

\* \* \* \* \*